3,840,626
METHOD FOR PRODUCING A HOLLOW PLASTIC OBJECT

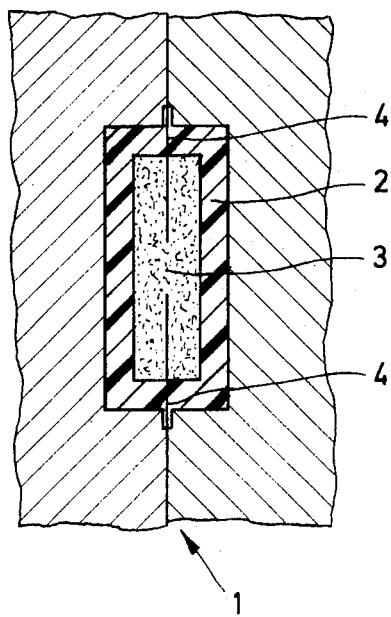

Werner Laskawy, Lothar Strutz, and Gunter Kruger, Wolfsburg, Germany, assignors to Volkswagenwerk Aktiengesellschaft, Wolfsburg, Germany
Continuation-in-part of abandoned application Ser. No. 37,617, May 15, 1970. This application July 11, 1972, Ser. No. 270,734
Claims priority, application Germany, May 21, 1969, P 19 25 843.6
Int. Cl. B29d 27/00
U.S. Cl. 264—45                    5 Claims

ABSTRACT OF THE DISCLOSURE

A hollow plastic object is produced by a method comprising suspending a casting core constructed of a foamed, thermoplastic plastomer having a closed cell structure within a mold cavity. Then, a hard-foam reaction mixture capable of autogenously producing a reaction temperature sufficiently high to melt the core is introduced into the cavity around the core. As the mixture reacts, the temperature increases and the core melts whereby its cells collapse and the plastomer material from which it was constructed is precipitated along the walls of the hollow space thus produced within the object.

CROSS REFERENCES TO RELATED APPLICATIONS

This is a continuation-in-part application of our copending application, Ser. No. 37,617, filed May 15, 1970, and now abandoned.

BACKGROUND OF THE INVENTION

This invention relates to a method for the formation of hollow plastic objects manufactured by a reaction pressure casting process. In particular, the invention relates to the production of hollow plastic parts constructed of a polyurethane duromer for use in a motor vehicle.

SUMMARY OF THE INVENTION

The present invention is directed to a method for the production of an article constructed of a hard (or rigid) thermoset foam and having a hollow cavity therein. Specifically, the invention comprises the suspension of a foamed thermoplastic plastomer casting core within a mold cavity by suspension procedures which are well known to those skilled in the art. The foamed casting core has a closed cell structure and a low density which stems from the fact that predominant portions, and often up to 98% of the volume of the core (its cells) are filled with gas (usually air). Because the core is constructed of a thermoplastic plastomer material, upon being heated to its melting temperature it will melt whereupon its cells will collapse to release the gas therewithin and significantly reduce its total effective volume.

The molded article itself is constructed of a hard (or rigid) foam of the type normally used in reaction pressure casting processes. Thermosetting rigid foams are well known to those skilled in the art and include such materials as polyurethane-duromers. The rigid foam reaction materials, which are usually liquid, are introduced into the mold cavity around the casting core and are maintained within the cavity sufficiently long for cross-linking to occur. The cross-linking reactions are exothermic and the primary significant requirement of the system is that the reaction mixture be capable of autogenously producing a reaction temperature sufficiently high to melt the casting core. Thus, the cells of the core will collapse and the plastomer material thereof will be greatly reduced in volume and will precipitate along the walls of the resultant hollow space in the rigid foam article. Accordingly, the present invention comprises a process for production of hollow articles through the use of a so-called "lost core" method wherein the core itself substantially "disappears" during the manufacture of the finished product. This, of course, is accomplished by the great reduction of volume which occurs when the foamed core structure collapses upon melting of the plastomer material from which it is constructed. Despite its small volumetric weight, the strength of the foamed casting core is sufficient because the cells of the plastomer foam are closed and are therefore capable of withstanding the mold pressure. The raw material mixture cannot penetrate the cells and it is possible to maintain precisely the required thickness of the walls.

According to the invention it is possible to not only produce open but also closed hollow spaces without the use of inserted parts and slides. This shortens production time and favors the use of the process in mass production.

DESCRIPTION OF THE DRAWING

The single figure is a cross-sectional view of a closed mold contained reacting hard foam material surrounding a foamed plastomer casting core.

DESCRIPTION OF THE PREFERRED EMBODIMENT

In the drawing, the numeral 1 designates a divided foaming mold serving for the production of a plastic body 2, which is closed on all sides, by means of a reaction pressure casting process. A casting core 3 is supported by means of wires 4 clamped into the separating joint of the foaming mold 1. The manner in which the core is placed in the mold and the manner in which the hollow article is produced are both manifest from the drawing. The use of wires such as 4 for supporting a casting core in a mold cavity is a well-known procedure wherein the wires 4 are embedded within the core 3 and are then clamped between the opposing faces of the mold itself. The area occupied by the plastic body 2 is initially empty and the wires 4 hold the core 3 in place.

The core is constructed of a closed cell foamed thermoplastic material which initially occupies a large volume and which substantially "disappears" upon being heated to its melting temperature by virtue of the fact that its closed cell structure will collapse when it is melted. In this regard, the core 3 preferably is constructed of a foamed thermoplastic plastomer having at least about 90% of its total volume filled with a gas such as air. Accordingly, when the thermoplastic material melts, its effective volume will be greatly reduced and the space formerly occupied thereby will become hollow.

For purposes of the present invention, it is necessary only that the core be constructed of a foamable thermoplastic plastomer capable of assuming a closed cell structure. Many such plastomers are known and one which is preferred is polystyrene which melts at about 150° C. The present invention, however, does not depend upon the fact that any specific plastomer is used but rather, in accordance with the invention, any plastomer can be utilized so long as it is capable of forming a closed cell foam and has a melting temperature lower than the temperatures developed in the reacting hard foam system. This melting temperature, of course, may be varied by the inclusion of additives, such as plasticizers, whereby to adapt the same for use with specific hard foam reaction mixtures or desired final density of the product. In connection with this latter variable, it should be appreciated that the temperature developed in a polyurethane duromer product as it cures is dependent to a certain degree upon the density thereof.

The hollow object 2 is constructed of a hard foam material. Useful hard foam reaction mixtures include thermosetting reaction mixtures capable of producing a rigid foamed article. It of course is not necessary to the present invention that any particular material be utilized, the only critical thing being that the reaction mixture, upon reacting, will autogenously develop a temperature sufficiently high to melt the core. Such materials are well known in the art and include materials such as polyurethane duromers.

Duromers are thermosetting, high-polymer raw materials which are cross linked in a close meshed way up to their decomposition temperature. These materials are nearly as elastic as steel at low temperatures and they do not flow in a viscous manner even at high temperatures. Duromers behave elastically between about 50° C. and their decomposition temperature with very limited deformation. The shear module does not normally fall below about $10^2$ kp./cm.$^2$ at any temperature. In addition to polyurethane, duromers may also be formed from hardened polyester resins, hardened epoxy resins and hardened formaldehyde resins.

In the reaction pressure casting process of the instant invention, the reactants for a hard foam, such as a polyurethane duromer, may be sprayed, by means of a mixing head, into the mold cavity. After a relatively short time, the raw reactant mixture will begin to react with simultaneous expansion and pressure development. A smooth, hard cover layer will form at the contact surfaces between the reacting plastic and the mold, while at internal regions the object will have the usual finely porous structure of a hard foam. Molding pressures developed during such reaction often amount to between about 1 and 2 kg./cm.$^2$ and temperatures produced in the reacting system reach as high as 190° C.

In the production of a part made of a polyurethane duromer, two reactive components, namely, a polyol and an isocyanate are reacted. It is known that many isocyanates can be used in the formation of hard foams. Diphenylmethane diisocyanate is particularly preferred. Also there are a multitude of operable polyols; however, a preferred material comprises a polyether, produced through the reaction of an olefin oxide, such as ethylene or propylene oxide, with a polyvalent alcohol such as glycerin, hexane triol, pentaerythrite and the like.

The system must include a foaming agent such as a fluorochlorohydrocarbon, and a catalyst. The most frequently used catalysts for urethane duromer systems are tertiary amines, which catalyze both the reaction between an isocyanate and a polyol and the reaction between an isocyanate and water.

The polyol component, which preferably contains the foaming agent and catalyst, and the isocyanate component may be injected separately through injection nozzles into a mixing chamber where mixing occurs. Thereafter, the mixture is fed into the mold cavity. Generally speaking, the unfoamed mixture should be sufficient in quantity to fill 10 to 80% of the volume of the hollow space in the mold cavity. This range is desirable so that the density of the finished product may be varied selectively. Subsequently the foaming of the mixture within the mold cavity and the hardening thereof to polyurethane duromer takes place. This takes approximately 5 to 15 minutes.

As a standard value for the mixing ratio of the two main components, of the polyol and isocyanate, one can give 1:1. This ratio as well as the quantity of the additives must be determined, however, individually prior to use by means of corresponding individual experiments.

At the same time, one must be careful that the formation of a dense skin on the polyurethane duromer is not only a question of the formation of the recipe (formula), but also requires an exact maintenance of the temperature in the mold parts during processing. For medium and fairly large series, there must be an assurance that the mold will be controllable with regard to its temperature in some kind of manner. The best temperature control will be assured through properly tempered liquids. Therefore, the molds are preferably provided with a conducting system connected to a thermostat. The necessary temperature then depends on the desired density and on the formula used. Generally speaking, the temperature may vary between 40 and 80° C. and should be maintained as precisely as possible in this range.

The hard foam reaction mixture is injected into the mold cavity in surrounding relationship to the core 3 and fills the hollow space of the mold while expanding. After a period of time, the mixture sets and the reaction heat developed melts the casting core 3, so that only a crust thereof will remain as a deposit along the inside walls of the body 2. After removal of the mold, the projecting ends of the wires 4 may be cut off.

We claim:
1. A method for forming a hard-foam plastic body having a hollow space therein comprising:
   supporting a casting core in a mold cavity, said core being smaller than said cavity and being constructed of a foamed, thermoplastic plastomer having a closed cell structure, said closed cell structure being collapsible in response to melting of the plastomer;
   introducing a hard-foam reaction mixture into said cavity around the core, said mixture being capable of autogenously producing a reaction temperature sufficiently high to melt said core; and
   maintaining the mixture within the cavity until it reacts and hardens and achieves said reaction temperature whereby to melt and collapse the cells of the core and cause the plastomer material thereof to precipitate along the walls of the resultant hollow space.

2. A method as set forth in Claim 1 wherein said core is completely surrounded by said mixture during said introduction step.

3. A method as set forth in Claim 1 wherein said hard foam comprises a foamed polyurethane duromer.

4. A method as set forth in Claim 1 wherein said core is constructed of foamed polystyrene.

5. A method as set forth in Claim 4 wherein said hard foam comprises a foamed polyurethane duromer.

References Cited
UNITED STATES PATENTS

| | | | |
|---|---|---|---|
| 3,099,516 | 7/1963 | Henrickson | 260—2.5 AZ |
| 3,320,339 | 5/1967 | Smith | 264—46 |
| 3,413,388 | 11/1968 | Lux et al. | 264—46 |
| 3,418,399 | 12/1968 | Ziegler | 264—35 |
| 3,520,769 | 7/1970 | Baker | 264—46 X |

OTHER REFERENCES

Buist et al., Advances in Polyurethane Technology, Maclaren, London, 1968, pp. 137–140.

Cellular Plastics, Nat'l Academy of Sciences, Washington, D.C. 1967, pp. 60–63.

H. S. COCKERAM, Primary Examiner

U.S. Cl. X.R.

264—317, 321